(12) United States Patent
Spariosu

(10) Patent No.: US 7,391,796 B1
(45) Date of Patent: Jun. 24, 2008

(54) ULTRA-LOW HEAT LASER

(75) Inventor: Kalin Spariosu, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 447 days.

(21) Appl. No.: 11/040,220

(22) Filed: Jan. 21, 2005

(51) Int. Cl.
*H01S 3/10* (2006.01)
*H01S 3/08* (2006.01)

(52) U.S. Cl. .......................... 372/28; 372/101

(58) Field of Classification Search ............ 372/28, 372/32, 92, 98, 101, 102, 108
See application file for complete search history.

(56) References Cited

U.S. PATENT DOCUMENTS

| | | | |
|---|---|---|---|
| 4,995,046 A * | 2/1991 | Fan et al. | 372/41 |
| 5,048,044 A * | 9/1991 | Ireland | 372/66 |
| 5,287,378 A | 2/1994 | Bowman et al. | |
| 6,246,711 B1 | 6/2001 | Stultz et al. | |
| 6,370,172 B1 | 4/2002 | Bowman | |

FOREIGN PATENT DOCUMENTS

DE  41 42 704 A1  5/1993

OTHER PUBLICATIONS

T. Taira et al., "Diode Pumped Tunable Yb:YAG Miniature Lasers At Room Temperature:Modeling and Experiment",IEEE J.Selected Topics Quantum Electron. 3(1), 100-103 (1997).

R. Sheps et al., "End-pumped Yb-doped Fluoropatite Laer", IEEE Photonics Tech Lett., 5(11), 1285-1288 (1993).

F. Auge et al., "Theoretical And Experimental Investigation Of A Diode Pumped Three Level Laser:Yb:Gdcob Laser", IEEE J. Quantum Electron, 36(5), 598-606 (2000).

S. Bowman et al., "Sensitivity And Stability Of A Radiation Balanced Laser System", IEEE J. Quantum Electron, 38(10), 1339-1348 (2002).

S. Andrianov, "Self-Cooling Solid State Lasers", Proc. SPIE vol. 5478 (2004).

S.V. Petrushkin et al., "Lawer Cooling Of Active Media in Solid-State Laser", Laser Physics 13(10), 1290-1296, 2003.

Schmid, Marc et al: "Optical in-well pumping of vertical-external-cavity surface-emitting laser", Applied Physics Letters, vol. 84 No. 24, Jun. 14, 2004, pp. 4860-4862.

(Continued)

*Primary Examiner*—Armando Rodriguez
(74) *Attorney, Agent, or Firm*—Leonard A. Alkov

(57) ABSTRACT

An ultra-low heat laser that does not rely on florescence cooling. Generally, the inventive laser includes a pump source operable at a pump frequency and a gain medium disposed to receive energy from the source and lase at a frequency close to the pump frequency. In the illustrative embodiment, the laser is a solid state laser having a gain medium which is resonantly pumped to lase at a frequency within 5% of the pump frequency. However, in the best mode and in accordance with the present teachings, the gain medium lases at a frequency within 1% of the pump frequency. In the illustrative embodiment, the laser gain medium ion has a rich Stark energy level structure and the laser active gain medium has oscillator strengths at transitions wavelengths that allow an ultra-low quantum defect operation. The pump source has a wavelength output centered to correspond to a predetermined pump band and an emission band subtended by an absorption bandwidth thereof.

10 Claims, 8 Drawing Sheets

OTHER PUBLICATIONS

J. Petit et al: "Laser oscillation with low quantum defect in Yb:GdVo4, a crystal with high tehermal conductivity", Optics Letters, vol. 29 No. 8, Apr. 15, 2004, pp. 833-835.

J. Petit et al: "Optical spectroscopy and laser oscillation in a high power laser material: Yb:GdVo4", Solid State Lasers and Amplifiers, vol. 5460 No. 1, Apr. 2004, pp. 132-140.

B. Hitz, "Researchers Around the World Obtain Vanadate Improvements", Photonics Spectra, Jan. 2004.

* cited by examiner

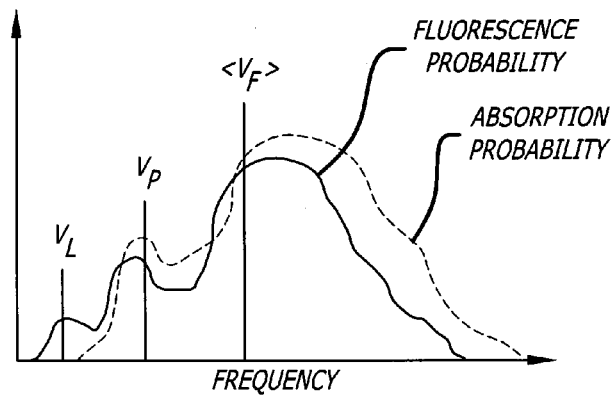
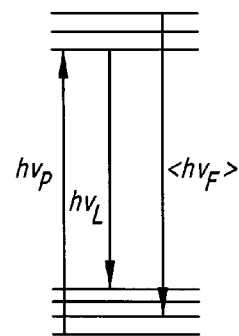
FIG. 3A
FIG. 3B
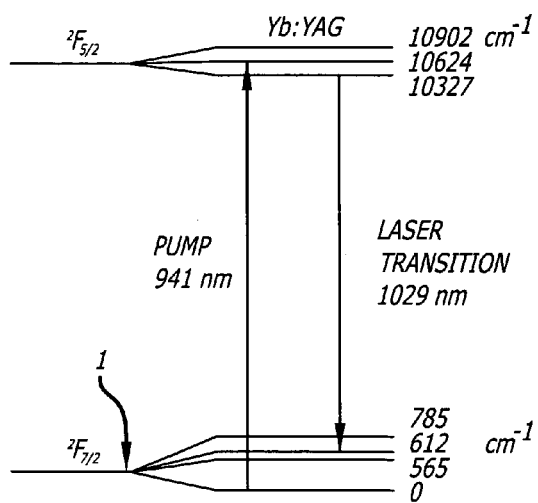
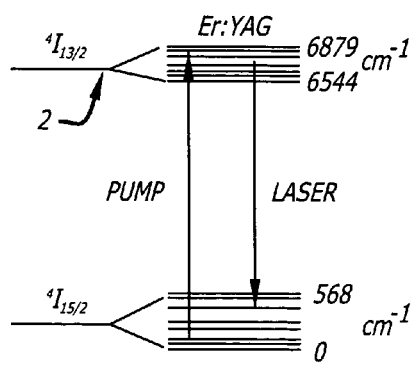
FIG. 4A
FIG. 4B

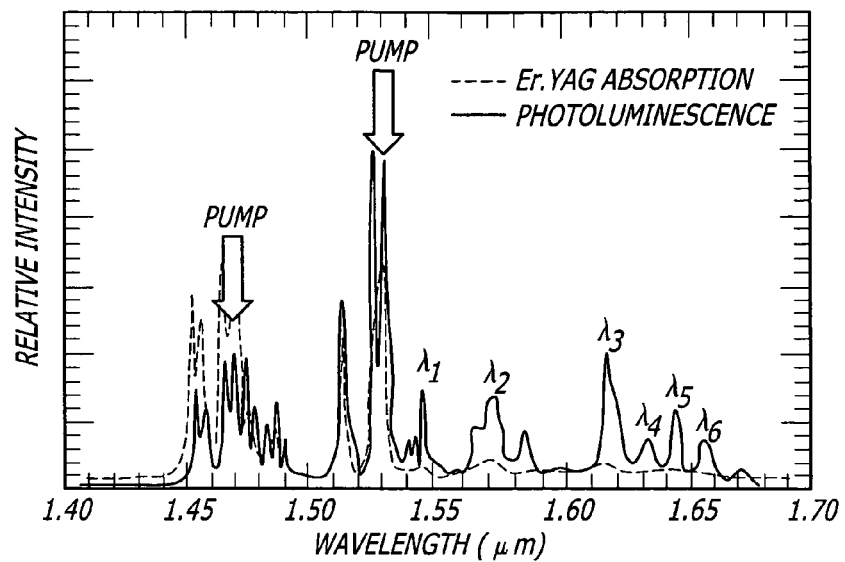
FIG. 5
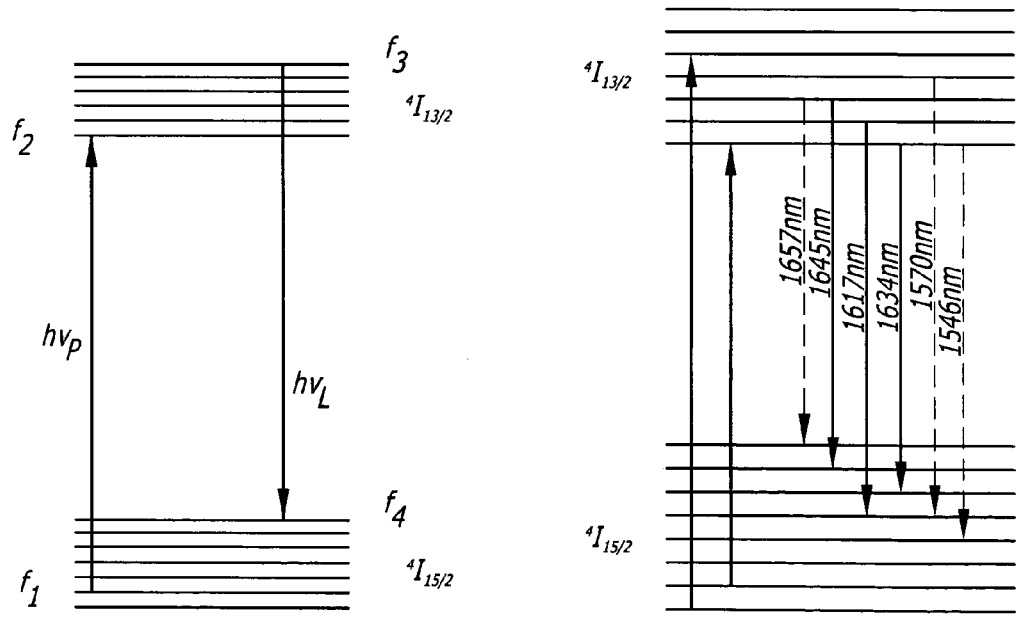
FIG. 6A
FIG. 6B

US 7,391,796 B1

ULTRA-LOW HEAT LASER

BACKGROUND OF THE INVENTION

1. Field of the Invention

The present invention relates to lasers. More specifically, the present invention relates to high-efficiency lasers and methods for fabricating same.

2. Description of the Related Art

Highly efficient lasers are needed for applications ranging from active sensors to high-energy lasers for directed energy weapons. Due to the high efficiency thereof, solid-state lasers have proven to be very useful for these applications. Unfortunately, when scaled to high average power levels, waste heat generated by these lasers typically cause thermal gradients in the gain media thereof. As the thermal gradients diminish the quality of the output beam, a heat management system is typically required in conjunction with systems for correcting the beam distortion caused by the waste heat. The waste heat is due to a non-ideal conversion of pump light to laser light. This defect is referred to as a 'quantum defect', the ratio of the photon frequency or energy of the laser divided by the photon frequency or energy of the pump.

Conventional approaches to the problem of waste heat in solid-state lasers include efforts to increase the efficiency thereof. Neodymium YAG lasers for example have shown efficiencies of approximately 70%, close to the quantum defect thereof. However, the sensible heat for these lasers remains substantial.

Ytterbium YAG lasers have also shown encouraging efficiency levels at or near 80%. However, scaling of these lasers to kilowatt levels requires a sophisticated thermal management system notwithstanding the efficiency thereof.

Radiation balanced or non-exothermic laser systems such as that disclosed in U.S. Pat. No. 6,370,172, issued Apr. 9, 2002; to S. R. Bowman, the teachings of which are hereby incorporated herein by reference, have been considered. This reference discloses a resonantly pumped laser in which the upper laser state manifold is the level that is being pumped into. That is, in a two level system, the pump manifolds have sublevels known as 'Stark energy levels'. Pumping into the Stark energy levels yields lasing action at different Stark energy levels. This approach is referred to a 'resonant pumping' and $Yb^{3+}$:YAG and $Er^{3+}$:YAG lasers—for example—are referred to as 'resonant pumped lasers'.

With the radiation balanced approach, an Ytterbium ($Yb^{3+}$) based crystal laser gain medium is chosen so that the pump frequency is lower than the mean florescence frequency so that a balance is achieved whereby the mean florescence frequency is equal to the pump laser frequency plus the laser frequency. Unfortunately, this approach is challenging and problematic in that the florescence rates must be fast enough in order to meet the second requirement namely, the spontaneous emission rate times the mean fluorescence frequency plus the stimulated emission (laser emission) rate times the laser frequency must be equal to the pumping rate times the pump frequency. Since fluorescence emission is the means for cooling, the gain geometry must be such that the fluorescence emission is effectively dispatched outside the lasing medium in order to prevent re-absorption into the gain medium which would diminish the cooling effect. This typically puts severe restrictions on the laser gain geometry such that at least one optically thin dimension is required.

Consequently, this approach is heavily dependent on florescence cooling to achieve a low heat laser design. Florescence cooling approaches are limited in that generally, three requirements that must be met: 1) the mean fluorescence frequency must be higher than the pump frequency; 2) the fluorescence rates must be sufficiently high as mentioned above; and 3) the florescence re-absorption must be minimized for the waste heat to escape.

Hence, a need remains in the art for a highly efficient laser with a substantially reduced need for thermal management.

SUMMARY OF THE INVENTION

The ultra-low heat laser of the present invention addresses the need in the art without reliance on florescence cooling. Generally, the inventive laser includes a pump source operable at a pump frequency and a gain medium disposed to receive energy from the source and lase at a frequency close to the pump frequency.

In the illustrative embodiment, the laser is a solid-state laser having a gain medium which is resonantly pumped to lase at a frequency within 5% of the pump frequency. However, in the best mode and in accordance with the present teachings, the gain medium lases at a frequency within 1% of the pump frequency.

In the illustrative embodiment, the laser gain medium ion has a rich Stark energy level structure and the laser active gain medium has oscillator strengths at transitions wavelengths that allow an ultra-low (e.g. 1%) quantum defect operation. The pump source has a wavelength output centered to correspond to a predetermined pump band and an emission band subtended by an absorption bandwidth thereof.

In addition, a master-oscillator power amplifier (MOPA) is taught. The inventive MOPA includes a laser resonator comprising a first reflective element adapted to transmit radiation received from a pump source and reflect energy at the lasing frequency, a first laser gain medium disposed to receive pump energy via the first reflective optical element means and lase at a frequency close to the pump frequency, a reflective outcoupler in functional alignment with the gain medium and an amplifier chain comprising second and third laser gain mediums, a first transmissive element disposed between the outcoupler and the second laser gain medium, a second transmissive element disposed between the second gain medium and the third gain medium and a third transmissive element disposed at an output end of the third gain medium.

In the illustrative embodiment, the first reflective element of the amplifier is a volume Bragg grating holographic optical element with an acceptance angle sufficient to provide for high transmission of the pump radiation and narrow spectral selectivity to provide for high reflection of energy at the lasing wavelength. In addition, the first, second and third transmissive elements have narrow acceptance angles with high transmission at the lasing frequency.

With respect to the MOPA implementation, in the illustrative embodiment, the laser is a solid state laser having a gain medium which is resonantly pumped to lase at a frequency within 5% of the pump frequency. However, in the best mode and in accordance with the present teachings, the gain medium lases at a frequency within 1% of the pump frequency. The laser gain medium active ion has a rich Stark energy level structure and oscillator strengths at transitions/wavelengths that allow an ultra-low (e.g. 1%) quantum defect operation. The pump source has a wavelength output centered to correspond to a predetermined pump band and an emission band subtended by an absorption bandwidth thereof.

Further, a method for fabricating a laser is taught. The inventive method includes the steps of:

selecting a laser gain medium (active crystal or amorphous solid) having an optimized Stark energy level structure to satisfy predetermined gain requirements while providing for strong absorption and operation with a minimized quantum defect and reasonable oscillator strength emission bands;

identifying appreciable oscillator strength transitions and pump band absorptions in the laser gain material; and providing a customized pump source for the host with a center wavelength that matches a chosen absorption band in the crystal and has a line width emission that is within an absorption line width of an absorption band thereof.

BRIEF DESCRIPTION OF THE DRAWINGS

FIG. 2b is a diagram showing sample fluorescence/emission spectra for the Yb:crystal of FIG. 2a.

FIG. 3 is a diagram illustrating the basic principles and requirements behind the operation of a radiation balanced laser.

FIGS. 4a and 4b show illustrative energy level structure of a resonantly pumped laser system. Er:YAG is an example of a laser crystal that has a rich Stark energy level structure in accordance with the present teachings.

FIG. 5 shows Er:YAG absorption and photoluminescence and the available pump/laser bands combos.

FIGS. 6a and 6b show resonant pump bands and potential laser transitions for Er:YAG lasers.

FIG. 14a shows an end view of the alternative embodiment of the integrated pump cavity of FIG. 13a.

FIG. 14b shows a perspective view of the alternative embodiment of the integrated pump cavity of FIG. 13a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The implementation of a quasi-two level (also known as resonantly pumped) laser provides for potentially the lowest quantum defect (QD) operation—although not necessarily the lowest overall optical efficiency operation. For instance, a Neodymium: crystal (YAG, YVO4, GdVO4, etc.) laser has a quantum defect of ~25% (when pumped at 808 nm) and ~16% (when pumped at 897 nm) yet has been demonstrated with optical efficiencies exceeding 70% because it is a 4-level laser which provides for easily achieving near 100% pump absorption efficiency. Specifically, Nd:GdVO4 has been operated with 79% slope efficiency. (See "Researchers Around the World Obtain Vanadate Improvement", by B. Hitz in *Photonics Spectra*, January 2004.)

Figure 1B:
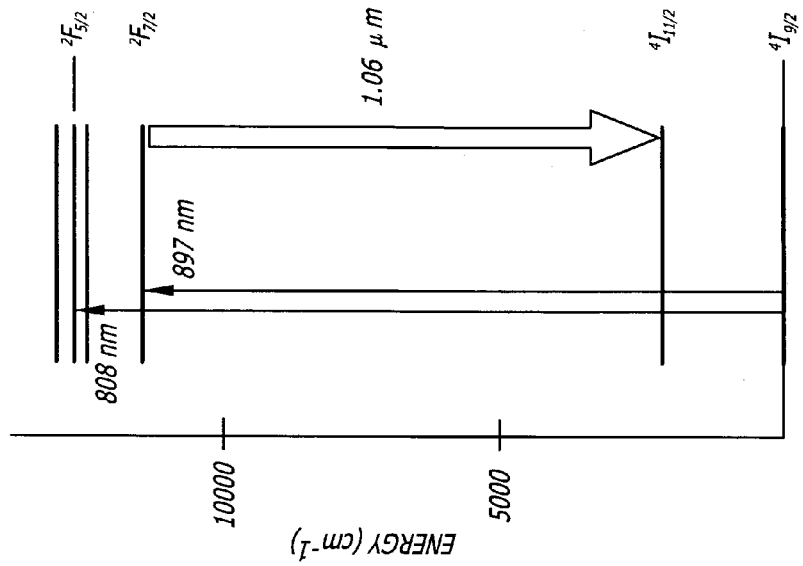
FIG. 1a and FIG. 1b show a pumping scheme for the 4-level Nd laser in accordance with conventional teachings.
Figure 1A:
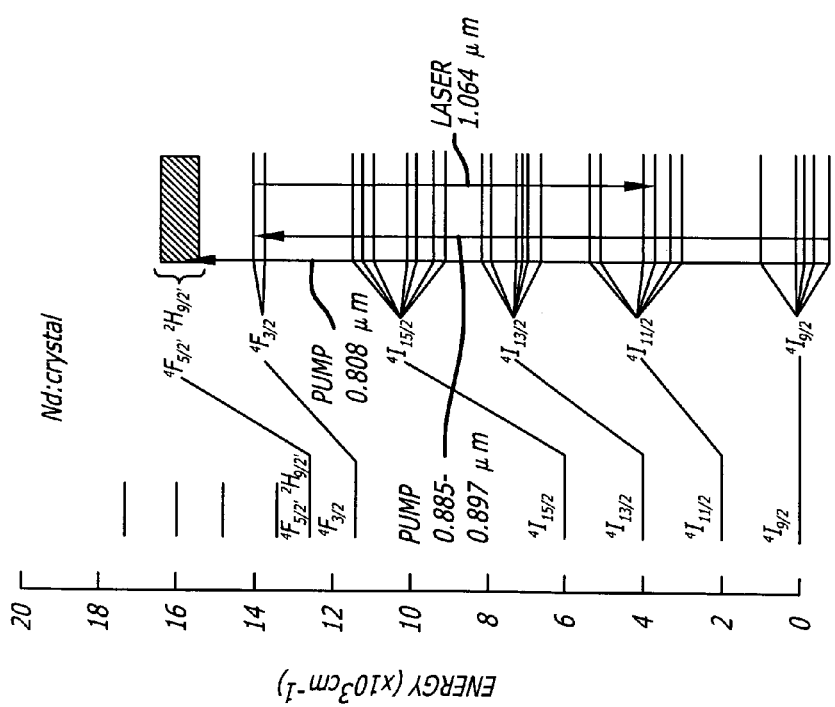

FIG. 1a and FIG. 1b show a pumping scheme for the 4-level Nd laser in accordance with conventional teachings. Quasi-two level lasers exhibit a quasi-three level feature (depending on the lower Stark laser level population), which carries with it a certain amount of pump overhead (in addition to resonator losses) to reach threshold. Also, the resonantly pumped laser scheme bleaching of the transition (at the pump wavelength) typically results in the optimized pump absorption to be less than 100%. Both of these factors typically contribute to an overall efficiency reduction of these quasi-two level (resonantly pumped) laser systems. Nonetheless, the quasi-2 level laser offers a significantly lower quantum defect than conventional 4-level lasers (such as Nd:YAG), which offers robust thermal handling and superior beam quality.

One of the best known quasi-two level (resonantly pumped) laser system is the Yb:YAG laser which when pumped near 940 nm exhibits a quantum defect of ~9% and a QD of ~6% when pumped near 970 nm. Recent reports show that optical slope efficiencies of ~60% were achieved in Yb:YAG and Yb:FAP and as high as 80% in slightly cooled Yb:GdCOB. (See "Diode pumped tunable Yb:YAG Miniature Lasers At Room Temperature: Modeling And Experiment", by T. Taira et al., IEEE J. Selected Topics Quantum Electron. 3(1), 100-103 (1997); "End-pumped Yb-doped Fluoropatite Laser", by R. Scheps et al., IEEE Photonics Tech Lett., 5(11), 1285-1288 (1993); and "Theoretical And Experimental Investigation Of A Diode Pumped Three Level Laser: Yb:Gdcob Laser", by F. Auge et al., IEEE J. Quantum Electron. 36(5), 598-606 (2000).) An illustrative Yb:crystal energy level structure is shown in FIGS. 2a and 2b.

Figure 2A:
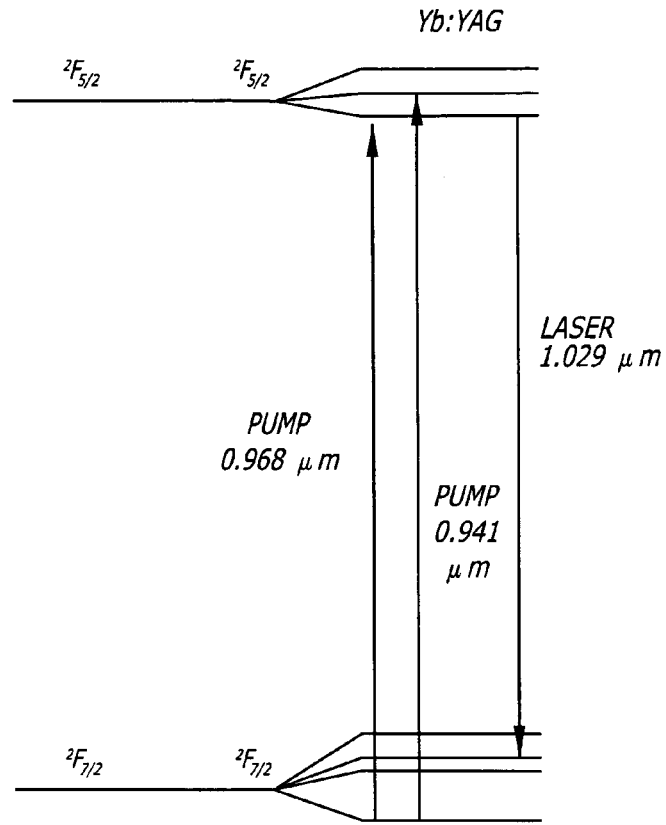
FIG. 2a is a diagram showing an illustrative Yb:crystal energy level structure.
Figure 2B:
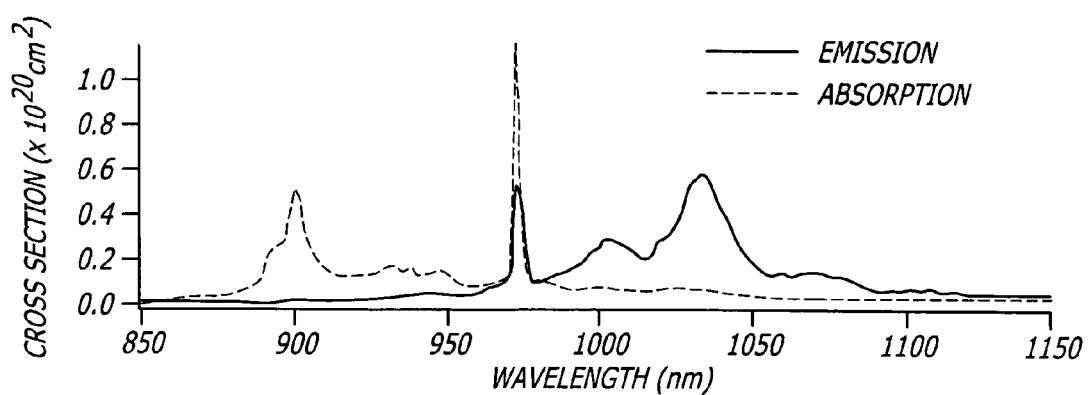

FIG. 2a is a diagram showing an illustrative Yb:crystal energy level structure. FIG. 2b is a diagram showing a sample fluorescence/emission spectra for the Yb:crystal of FIG. 2a.

Radiation balanced or non-exothermic lasers are based on quasi-two level resonantly pumped lasers systems. (See "Sensitivity And Stability Of A Radiation Balanced Laser System", by S. Bowman et al., *IEEE J. Quantum Electron.* 38(10), 1339-1348 (2002); "Self-Cooling Solid State Lasers", S. Andrianov, Proc. SPIE Vol. 5478 (2004); and "Laser Cooling Of Active Media in Solid-State Laser", by S. V. Petrushkin et al., *Laser Physics* 13(10), 1290-1296, 2003.) A fundamental requirement for a zero heat operation of a radiation balanced laser is an efficient fluorescence cooling mechanism.

FIG. 3 is a diagram illustrating the basic principles and requirements behind the operation of a radiation balanced laser. The conditions/requirements for radiation balanced operation are: i) significant overlap between absorption and fluorescence spectra; ii) $v_L < v_P < v_F$ where $v_L$ is the laser frequency, $v_P$ is pump frequency, and $V_F$ is mean fluorescence frequency; iii) (pump rate) X $hv_p$=(stimulated emission rate) X $hv_L$+(Spontaneous emission rate) X $hv_F$ (where h is the Plank constant); iv) the fluorescence lifetime is required to be short (or the spontaneous emission rate has to be high) to minimize the efficiency hit due to fluorescence photon losses; v) the laser gain geometry is required to be optically thin in at least one dimension; and vi) non-radiative loss rate <<spontaneous emission rate.

The fluorescence emission requirements listed above provides for a severely limited implementation of the radiation balanced laser. Crystals such as Yb:KYW show promise of fulfilling these requirements. The above-referenced Bowman patent on non-exothermic lasers lists these requirements and potential crystals that could be utilized for this radiation balanced operation. A key mechanism (and—therefore—limitation) of the radiation balanced laser is the strict adherence of the fluorescence properties to the requirements enumerated above.

Hence, as stated above, a need exists in the art for a highly efficient laser with a substantially reduced need for thermal management. The need is addressed by the ultra low heat laser (ULHL) and methods of the present invention.

Design Methodology

In the best mode, the inventive ultra-low heat laser (ULHL) employs a resonantly pumped laser such as $Yb^{3+}$ or $Er^{3+}$ laser in a crystal host Those skilled in the art will appreciate that the invention is not limited to a resonantly pumped laser or to the use of a crystal host. An illustrative energy level structure of a resonantly pumped laser system is illustrated in FIGS. 4a and 4b. Resonantly pumped lasers have the pumping and laser action occurring between the ground and first excited state energy level manifolds 1 and 2. The energy level manifolds have degeneracy that is split due to the crystal field. These degenerate energy levels are referred to as "stark" energy levels. The pump and laser action occur then between different Stark energy levels as illustrated in these FIGS. 4a and 4b.

The advantages of a resonantly pumped laser system are: i) inherently low quantum defect because laser action occurs from within the same manifolds as the pumping and ii) a lower laser energy level resides within the ground state manifold, which essentially eliminates bottlenecking The second requirement for an ULHL in accordance with the present teachings is that the laser gain medium/active laser ion have an "rich" Stark energy level structure. Er:YAG—for example—satisfies this condition as it has 8 Stark energy levels in the ground state manifold and 7 in the upper energy level manifold as shown in FIG. 4b. Yb:YAG—by comparison—does not have a rich Stark level structure—as can be seen in FIG. 4a.

The third requirement for an ULHL in accordance with the present teachings is that the laser active gain media have appreciable oscillator strengths/at transitions/wavelengths that will allow an ultra-low quantum defect operation. Ultra-low quantum defect operation is defined as being <5% (preferably 1% or less). This is illustrated in FIG. 5 and in Table I (below) where Er:YAG is used as an example.

TABLE I

| $\lambda_{PUMP}$ [nm] | Laser wavelength designation | $\lambda_{LASER}$ [nm] | Quantum defect [%] |
|---|---|---|---|
| 1471 | $\lambda_2$ | 1570 | 6.3 |
| 1471 | $\lambda_1$ | 1546 | 4.9 |
| 1533 | $\lambda_5$ | 1645 | 6.8 |
| 1533 | $\lambda_4$ | 1634 | 6.2 |
| 1533 | $\lambda_3$ | 1617 | 5.2 |
| 1533 | $\lambda_2$ | 1570 | 2.4 |
| 1533 | $\lambda_1$ | 1546 | 0.8 |

FIG. 5 shows Er:YAG absorption and photoluminescence and the available pump/laser bands combos. The common (published) 1645 nm laser was demonstrated previously and it operated with ~7% QD. The available strong oscillator strength transitions indicated with $\lambda_{1-6}$ are a clear indication that Er:YAG has the potential to operate with as low as 0.8% QD. Other crystal hosts for $Er^{3+}$ may prove even more favorable. Clearly, Er:YAG offers a sufficient number of strong oscillator strengths and is therefore a candidate for ULHL in accordance with the present teachings.

The resonant pump and potential laser transitions for Er:YAG are shown in FIGS. 6a and 6b. In FIGS. 6a and 6b, $f_n$ are the Boltzmann fractional population densities governed by the Stark energy level and the temperature of the medium—relative to the particular manifold zero energy level.

The last design requirement for an ULHL in accordance with the present teachings is to implement a fiber laser or a diode laser pump source with a customized wavelength output to be centered to correspond to a particular chosen pump band and to have an emission band narrow enough to be subtended by the absorption bandwidth. In accordance with the present teachings, a fiber laser is customized to achieve these characteristics. A diode laser is first designed with a customized emission wavelength and then implemented with a volume Bragg grating (VBG) reflector in order to narrow and lock the emission wavelength/bandwidth.

A resonant pumped laser (such as Er in a crystal host) is governed by the Boltzmann Stark energy level distribution, the absorption cross-section at a particular Stark—Stark energy level transition, and—particular Stark—Stark laser transition. FIG. 4 shows the available pump and emission lines and the Boltzmann distributions: The Boltzmann probabilities are temperature dependent and are defined as:

$$f_1(T) = \frac{e^{\frac{-\varepsilon_1}{kT}}}{\sum_j e^{\frac{-\varepsilon_j}{kT}}} \quad [1]$$

for the lower energy level (manifold) and $$f_2(T) = \frac{e^{\frac{\varepsilon_{20}-\varepsilon_2}{kT}}}{\sum_i e^{\frac{\varepsilon_{20}-\varepsilon_i}{kT}}} \quad [2]$$

for the upper energy level (manifold) where $\epsilon_{20}$ is the lowest Stark energy level of the upper state (manifold). The summing is done over the total number of Stark energy levels within each manifold. Similar expressions apply for the $f_3$ and $f_4$ Stark energy level population probabilities. Based on the quasi-two level laser architecture, we can define:

1. The maximum fractional population of the upper laser state:

$$N_{max}^{upper} = N_0 \frac{f_1}{f_1 + f_2} \qquad [3]$$

where $N_0$ is the total doping/concentration density of the active ions in the crystal host. This stems from the pump bleaching condition governed by:

$$f_1 N_L = f_2 N_U \qquad [4]$$

where $N_L$ and $N_U$ are the total lower and upper population densities respectively and $$N_0 = N_L + N_U \qquad [5]$$

2. The fractional population of the upper laser level (manifold) required to obtain transparency at the laser wavelength:

$$N_{lasertransparency}^{upper} = N_0 \frac{f_4}{f_3 + f_4} \qquad [6]$$

This expression stems from the condition for transparency at the laser wavelength:

$$f_3 N_U = f_4 N_L \qquad [7]$$

3. The maximum inversion density:

$$N_{max}^{inversion} = \frac{f_1 f_3 - f_2 f_4}{f_1 + f_2} N_0 \qquad [8]$$

where the expression for the maximum fractional upper state (manifold) population density from equation [3] was used.

The next step is to identify crystal hosts that offer a rich Stark energy level structure to satisfy gain (with strong oscillator strength emission bands) requirements while providing for available absorption bands such that operation with a <5% (goal of 1%) quantum defect is possible. Er:YAG is a suitable candidate for an ultra-low quantum defect operation.

Figure 7:
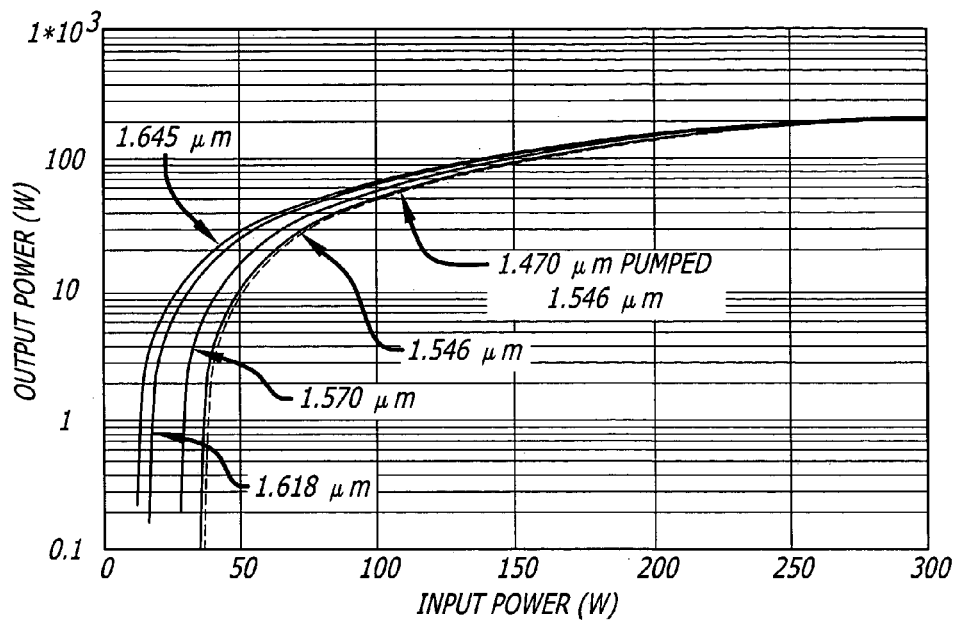
FIG. 7 is a diagram which shows an output power performance prediction as a function of input power—comparing four wavelengths/transitions in Er:YAG: 1.645 µm, 1.618 µm, 1.570 µm, and 1.546 µm.

FIG. 7 is a diagram which shows an output power performance prediction as a function of input power—comparing four wavelengths/transitions in Er:YAG: 1.645 µm, 1.618 µm, 1.570 µm, and 1.546 µm. In FIG. 7, solid lines represent 1533 nm pumping, single dashed red line represents 1470 nm pumped 1546 nm operation performance.

As per FIG. 5 above, QD pumping of ~5% or lower can be achieved with both 1533 nm and 1470 nm pumping.

The modified $P_{out}$ equation in terms of the appropriate Stark probabilities is written as:

$$P_{out} = \frac{(1-R_{oc})}{(1+R_{oc})} \frac{h\nu_L}{\sigma_L(f_3+f_4)\tau_F} \frac{\pi d^2}{4} \left( \frac{2\eta_t P_{in}}{(L-\ln(R_{oc}))\frac{\pi d^2}{4} \frac{h\nu_L}{\sigma_L(f_3+f_4)\tau_F}} - \frac{2 f_4 N_t l \sigma_L}{(L-\ln(R_{oc}))} - 1 \right) \qquad [9]$$

where $R_{oc}$ is output coupler reflectivity; $h\nu_L$ is laser photon energy; d is the mode diameter; $\tau_F$ is the fluorescence lifetime; L represents residual resonator passive losses; l is the laser gain length; $P_{in}$ is the input power; $\eta_t$ is the total laser efficiency defined as: $\eta_t = \eta_Q \eta_S \eta_B \eta_B$, where the first term is the quantum efficiency, the second term is the Stokes (laser/pump wavelength mismatch), the third term is the mode overlap efficiency, and the fourth term is the absorption efficiency; $N_t$ is the total ion doping density, and $\sigma_L$ is the stimulated emission cross-section—Stark level-to-level value.

FIG. 7 shows predicted power performance for a nominal set of resonator conditions for five different low QD transitions in Er:YAG. $P_{out}$ vs. $P_{in}$ prediction for resonantly pumped Er:YAG with the following assumptions: laser gain length, l=10 cm, $R_{oc}$=75%, non-saturable resonator losses=3%, Er doping concentration=0.5% atomic weight, $\eta_Q$=0.99, $\eta_S$=governed by the ratio of pump and lasing wavelength, $\eta_B$=0.85.

As can be noted, the threshold is very dependent on the pump and lasing Stark energy levels; however, operation point well into the saturated regime (well-above threshold) shows predicted high efficiency of operation. In this regime, it is the minimized sensible heat that will make a drastic difference in the operation of the laser and the thermal management implementation requirements.

The second metric for gauging the practical implementation of the ultra-low QD operation is the measure of the available inversion to the required threshold inversion governed by the resonator parameters/losses:

$$\frac{\frac{f_1 f_3 - f_2 f_4}{f_1 + f_2} N_t \sigma_0 2l}{L - \ln(R_{oc})} \qquad [10]$$

Figure 8:
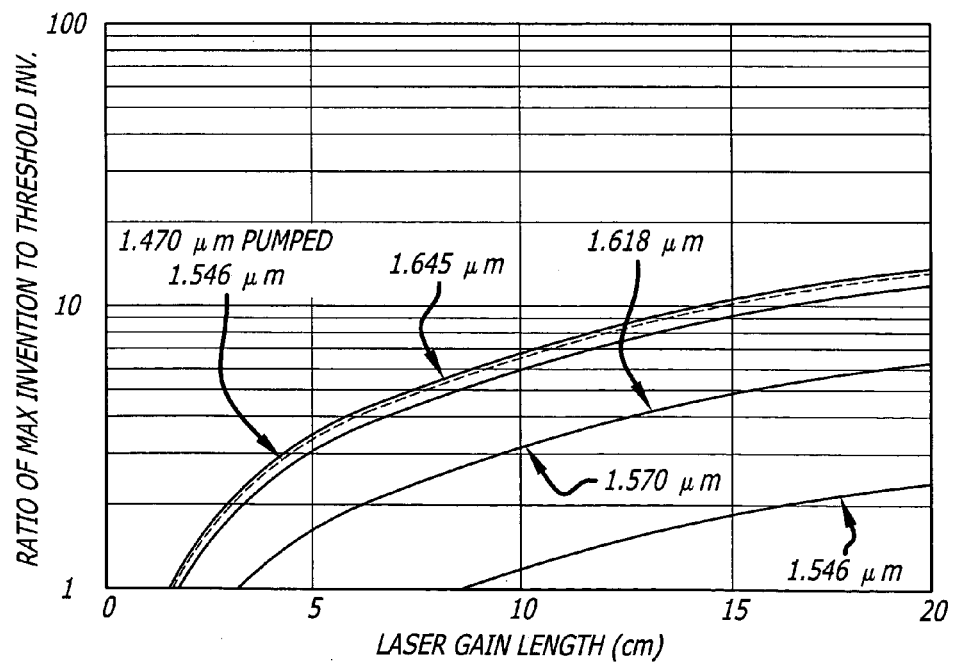
FIG. 8 is a series of graphs that show the ratio of available (maximum) inversion density to the threshold inversion density for the same resonator parameters/conditions described with respect to FIG. 7 above.

This is illustrated in FIG. 8.

FIG. 8 is a series of graphs which show the ratio of available (maximum) inversion density to the threshold inversion density for the same resonator parameters/conditions described with respect to FIG. 7. Note that even for the 0.8% QD operation, reasonable gain lengths can be allowed in order to implement the ultra-low QD resonantly pumped laser action. In FIG. 8, solid lines represent 1533 nm pumping, single dashed red line represents 1470 nm pumped 1546 nm operation performance.

It is worth noting that the above analysis utilized the strong absorption bands in Er:YAG. However, ultra low QD operation can also be achieved with the utilization of pump bands that have much weaker absorption. This would require an appropriate design of the pump cavity/laser resonator in accordance with the present teachings in order to ensure efficient coupling of pump radiation.

One such technique would be the implementation of a long waveguide (flat fiber) where end-pumping is achieved over a long enough length for near 100% absorption.

A second approach would be the implementation of an efficient integrating pump cavity in order to—again— achieve near 100% pump light absorption. Practical considerations such as imperfect internal reflection coatings and cooling approaches would have to be considered in this case/scenario.

Figure 9A:
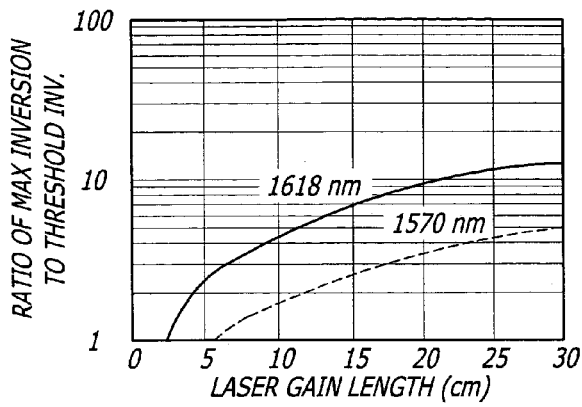
FIGS. 9a and 9b are graphs which illustrate the ratio of available (maximum) inversion density to the threshold inversion density and the predicted output power performance respectively for the 1549 nm pumped 1618 nm and 0.1570 nm laser bands in Er:YAG.
Figure 9B:
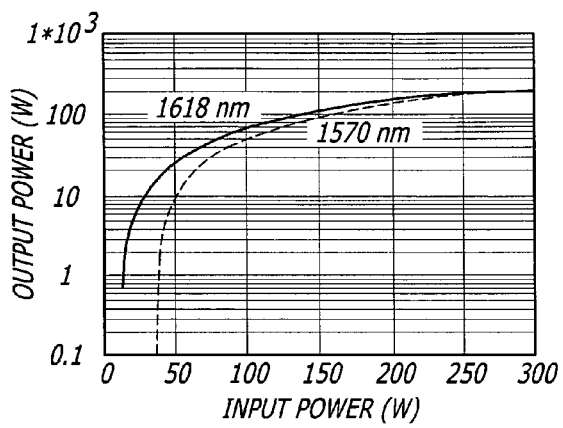

FIGS. 9a and 9b are graphs which illustrate the ratio of available (maximum) inversion density to the threshold inversion density and the predicted output power performance respectively for the 1549 nm pumped 1618 nm and 1570 nm laser bands in Er:YAG. FIGS. 9a and 9b show a model for 1549 nm pumped 1570 and 1618 nm laser bands (1.3% and 4.3% QD respectively). The same assumptions/resonator conditions were used as per FIG. 7—except the assumed gain length is 30 cm.

In summary, the inventive Ultra-Low Heat Laser (ULHL) described herein should provide minimal reliance on the fluorescence mechanism for cooling and take advantage of a rich Stark energy level structure—such as found in Er:crystals— to achieve (within existing oscillator strengths) ultra-low quantum defect resonant pumped operation. One should endeavor to implement the lowest QD operation on the most suitable laser system (as good or better than Er:YAG).

ILLUSTRATIVE EMBODIMENT

The illustrative method for implementing ultra-low quantum defect operation in accordance with the present teachings includes the following steps:

i) Implementation of a customized pump laser source (such as a diode laser) that operates at a precise design wavelength with a sufficiently narrow bandwidth to match the absorption band of the laser gain medium. For example, customized diode lasers, with external volume Bragg grating (VBG) output couplers, achieve the center wavelength locking in addition to providing a narrow emission bandwidth. This is illustrated in FIGS. 10a and 10b.

Figure 10A:
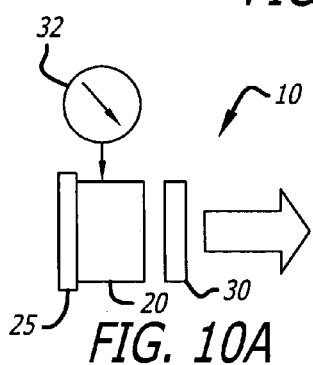
FIG. 10a is a simplified diagram of a customized diode laser pump source with a bandgap tuned to a center absorption band wavelength and a bandwidth narrowed to fit within the particular absorption band of the laser in accordance with the present teachings.

FIG. 10a is a simplified diagram of a customized diode laser pump source 10 with a bandgap tuned to a center absorption band wavelength and a bandwidth narrowed to fit within the particular absorption band of the laser in accordance with the present teachings. FIG. 10b is a diagram showing the emission band of the pump laser and the match to the absorption band of the Er:YAG laser—in this example. The source 10 is a diode laser array stack tuned to match a desired center wavelength. The stack includes an active medium 20 sandwiched between a high reflector 25 and a volume Bragg grating 30. The VBG 30 is used in place of a conventional reflector coating on the diode array. Hence, wavelength locking and bandwidth narrowing is achieved via volume Bragg grating (VBG) mirror technology.

Figure 10B:
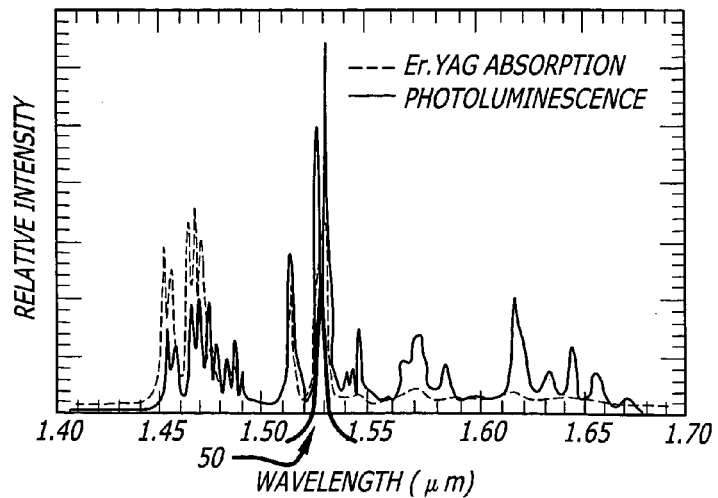
FIG. 10b is a diagram showing the emission band of the laser pump source of FIG. 10a showing a match to an Er:YAG absorption band.

The laser output is tuned to the center of the absorption peak shown at 50 in FIG. 10b and the emission bandwidth of the pump laser matches the absorption band of the laser gain medium.

ii) Implementation of a robust pump laser light coupling system that allows for high efficiency laser pump light coupling without compromising laser resonator mirror reflectivity. This can be achieved via customized dichroic filters/mirrors and VBG optical elements as shown in FIG. 11.

Figure 11:
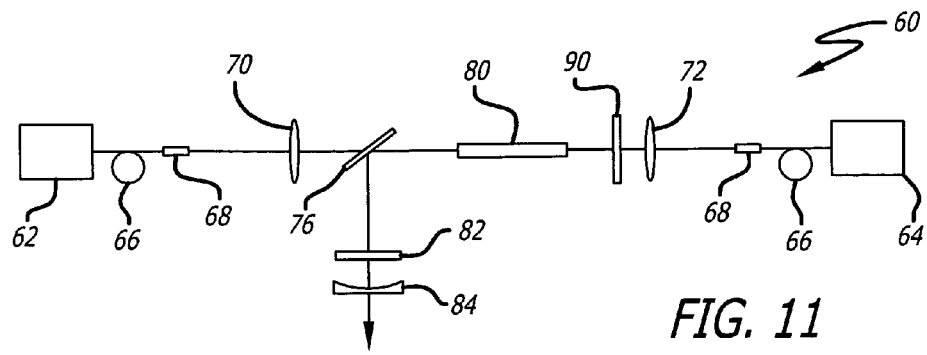
FIG. 11 is a simplified optical schematic showing an end-pumped ULHL laser utilizing customized output wavelength/bandwidth laser pump sources and ultra-high resolution dichroic mirrors in accordance with the present teachings.

FIG. 11 is a simplified optical schematic showing an end-pumped ULHL laser utilizing customized output wavelength/bandwidth laser pump sources and ultra-high resolution dichroic mirrors (such as VBGs) in accordance with the present teachings. The system 60 includes first and second fiber coupled pump lasers 62 and 64 each being coupled to a collimator 68 by a fiber pigtail 66. In the best mode, the lasers 62 and 64 are implemented as per the source 10 of FIG. 10a. The collimators 68 feed lenses 70 and 72 which focus pump energy output thereby through a dichroic beam splitter 76 and a dichroic mirror 90 respectively onto a resonantly pumped laser gain medium 80 implemented in accordance with the present teachings (See FIGS. 13 and 14.) That is, in accordance with the present teachings, the laser is designed to lase at a wavelength close to that of the pump source, i.e., within 5% and in the best mode, within 1% thereof. The dichroic mirrors pass pump wavelengths and reflect lasing wavelengths.

In the best mode of practicing the invention, the dichroic mirror 90 is implemented with a customized volume Bragg grating holographic optical element (VBG HOE). The VBG optical element 90 is an ultra-high resolution multiplexing device which will efficiently transmits pump light as little as several nanometers away from the laser line spectrally, while acting as a high reflector at the laser line/wavelength. Because end-pumping is desirable especially in the case of lower absorption coefficients, pump light multiplexing can be implemented through the customized VBG HOE (holographic optical element) with angle and polarization multiplexing techniques.

Figure 12A:
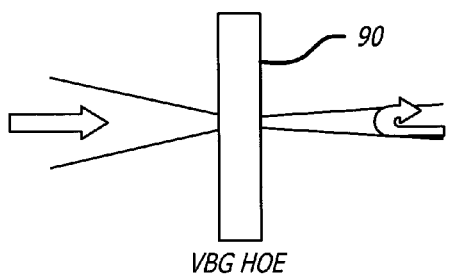
FIG. 12a is a simplified diagram of such a volume Bragg grating holographic optical element implemented in accordance with the present teachings.

FIG. 12a is a simplified diagram of such a VBG holographic optical element (HOE) implemented in accordance with the present teachings. The inventive VBG HOE 90 is a high-resolution dichroic optical element with very select band reflectivity (i.e. approximately 100% reflection with narrow spectral selectivity) at the laser line with a relatively large acceptance angle for high (i.e. approximately 100%) transmissivity at the pump wavelength. The VBG HOE 90 is fabricated by a specialized arrangement that writes customized holographic gratings in a sensitized high optical damage threshold glass material.

Returning briefly to FIG. 11, a broadband output coupler reflector 84 allows use of an intra-cavity tuning element such as an Etalon 82 to select a desired wavelength as the output beam.

Figure 12C:
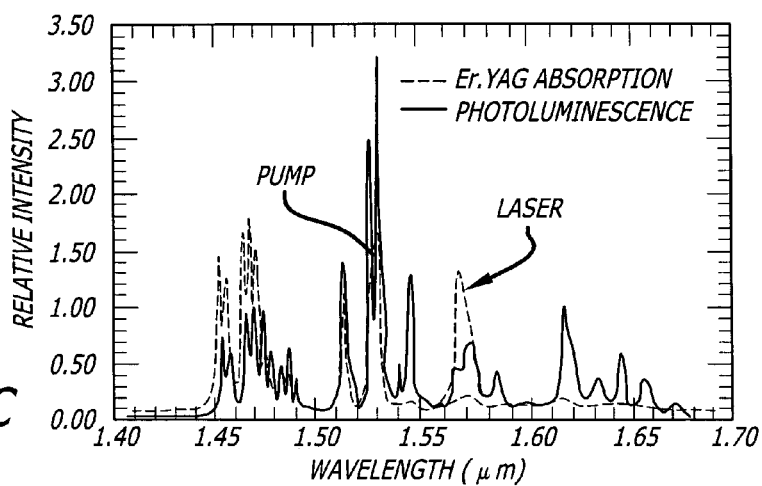
FIG. 12c shows graphs of Er:YAG absorption and photoluminescence.
Figure 12B:
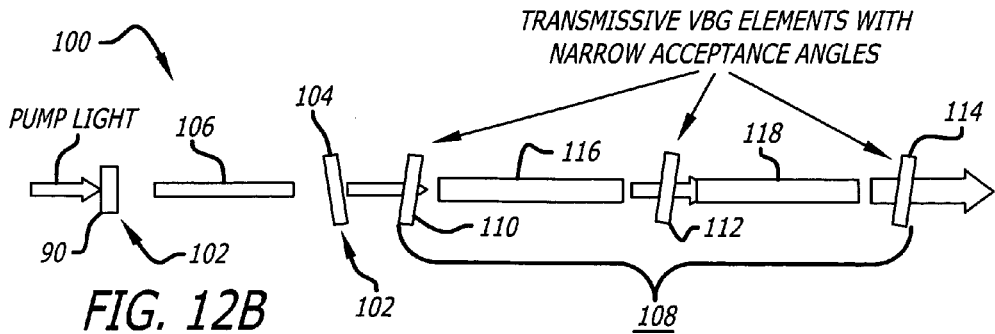
FIG. 12b is a simplified optical schematic showing an alternative embodiment of a laser resonator implemented in accordance with the present teachings for a master oscillator power amplifier MOPA application.

FIG. 12b is a simplified optical schematic showing an alternative embodiment of a laser resonator implemented in accordance with the present teachings for a master oscillator power amplifier (MOPA) application. As shown in FIG. 12b, the MOPA 100 includes a laser resonator 102 including the VBG HOE 90, a reflective VBG output coupler 104 and a gain medium 106. The VBG HOE 90 is used for efficiently multiplexing pump light that is very close in frequency to the laser light (in the end-pumping arrangement). The transmissive VBG HOE elements 110, 112, 114 should have narrow angular acceptance angles in order to act as both ASE suppressors/spectral and spatial filters for the MOPA arrangement shown. The resonator 102 feeds an amplifier chain 108 consisting of first, second and third transmissive VBG elements 110, 112, and 114 and second and third gain media 116 and 118 disposed therebetween. In the illustrative embodiment, the laser is a solid-state laser and the gain medium example shown is Er:YAG. The amplifier chain 108 utilizes the VBGs 110, 112 and 114 as angular aperture elements in order to reduce parasitic losses—as mentioned above.

Since resonant pumped lasers such as Er:YAG are relatively low gain systems, the oscillator strengths thereof are roughly similar. Therefore, a relatively small degree of suppression will achieve the goal of selecting the desired laser line and suppressing the remaining competing lines. This can be achieved with the utilization of an output coupler that is a volume Bragg grating. (VBG) transmissive optical element which only has a finite appreciable reflectivity at the wavelength of choice and near zero reflectivity at the competing laser lines (wavelengths). The VBG elements can be incorporated both as reflective and transmissive types that can provide a venue for robust MOPA implementation as well. The efficient coupling of the pump light is also achieved with the customized VBG element 90.

FIG. 12c shows graphs of Er:YAG absorption and photoluminescence. These figures show a method for invoking ultra-low quantum defect operation in ULHL (Er:YAG shown as a spectroscopy example) in accordance with the present teachings. Selective output coupler reflectivity is based on a VBG optical element.

Figure 13A:
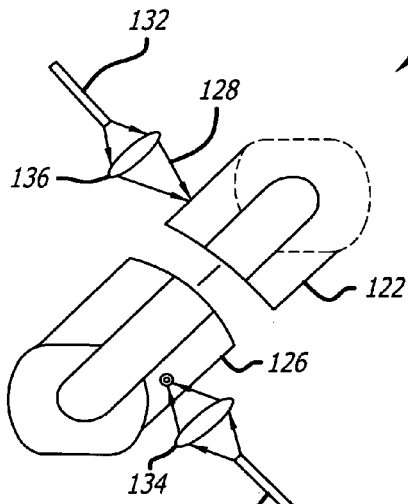
FIGS. 13a and 13b show perspective and sectional side views of an integrated pump cavity with multiple pump light insertion points in accordance with the present teachings.
Figure 13B:
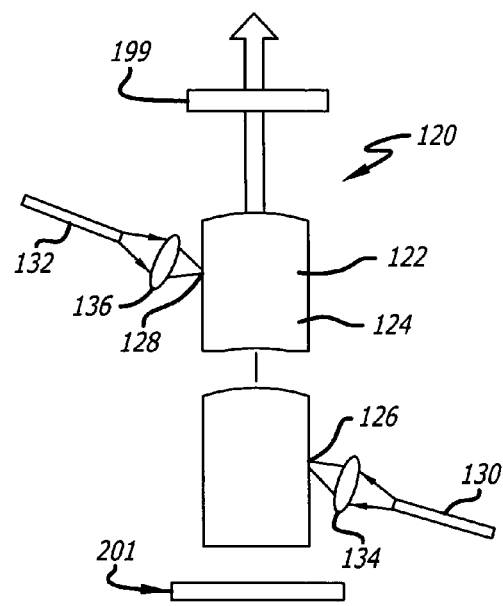

FIGS. 13a and 13b show an implementation of an integrating pump cavity approach in which a long integrating pump cavity with multiple pump light insertion points for near 100% pump light absorption for use in cases where the pump wavelength chosen has an inherently low absorption coefficient. FIG. 13a is a perspective view of the integrated pump cavity 120 adapted for use in the laser resonators 80 and 102 above. FIG. 13b is a sectional top view of the cavity. As shown in FIGS. 13a and 13b, the cavity is provided by a cladding on which a highly reflective coating 124 is provided for internal reflection of pump light. Multiple insertion points 126, 128 are provided to receive pump light from fibers 130 and 132 via focusing lens 134 and 136. Laser action occurs via a resonator comprised of an output coupler 199 and a high reflector 201.

Figure 14A:
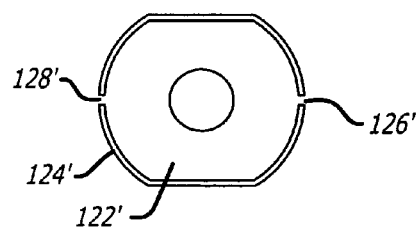
Figure 14B:
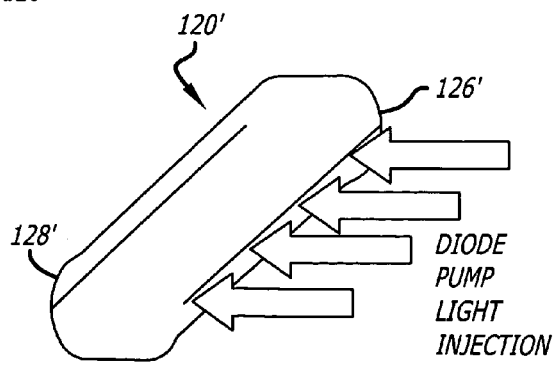

A more conventional integrating pump cavity approach is shown in FIGS. 14a and 14b. FIG. 14a shows an end view and FIG. 14b shows a perspective view of the alternative embodiment of the integrated pump cavity 120' in a side pumped configuration where diode pump light is inserted through slits 126' and 128' that run the entire length of the laser gain length. This embodiment is disclosed and claimed in U.S. Pat. No. 6,246,711 issued to R. D. Stultz et al. on Mar. 25, 1999, the teachings of which are hereby incorporated herein by reference:

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A laser comprising:
   a volume holographic optical element adapted to transmit radiation received from a pump source at a pump frequency and reflect energy at a lasing frequency;
   a reflective outcoupler; and
   a gain medium disposed between said volume holographic optical element and said outcoupler to receive energy from said source and lase at a frequency within 5% said pump frequency.

2. The invention of claim 1 wherein said gain medium is resonantly pumped.

3. The invention of claim 1 wherein said laser is a solid state laser.

4. The invention of claim 1 wherein the laser gain medium has an ion with a rich Stark energy level structure.

5. The invention of claim 1 wherein said laser active gain medium has oscillator strengths at transitions wavelengths that allows an ultra-low quantum defect operation.

6. The invention of claim 5 wherein said ultra-low quantum defect operation is <5%.

7. The invention of claim 1 wherein said pump source has a wavelength output centered to correspond to a predetermined pump band.

8. The invention of claim 7 wherein said pump source has an emission band subtended by an absorption bandwidth thereof.

9. The invention of claim 1 wherein said laser has an Erbium activated crystalline or amorphous solid host.

10. A laser comprising:
    a volume holographic optical element adapted to transmit radiation received from a pump source at a pump frequency and reflect energy at a lasing frequency;
    a reflective outcoupler; and
    a gain medium disposed between said volume holographic optical element and of said outcoupler to receive energy from said source and lase at a frequency within 5% said pump frequency, said laser active gain medium having oscillator strengths at transitions wavelengths that allows an ultra-low quantum defect operation, said ultra-low quantum defect operation being <5%.

* * * * *